United States Patent
Laski et al.

(10) Patent No.: US 7,796,034 B2
(45) Date of Patent: Sep. 14, 2010

(54) METHOD AND SYSTEM FOR CONTROLLING LIGHTING

(75) Inventors: Joseph Laski, Stoneham, MA (US); Makarand H. Chipalkatti, Lexington, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 12/548,157

(22) Filed: Aug. 26, 2009

(65) Prior Publication Data

US 2009/0310348 A1    Dec. 17, 2009

Related U.S. Application Data

(62) Division of application No. 11/161,449, filed on Aug. 3, 2005, now Pat. No. 7,598,859.

(60) Provisional application No. 60/601,373, filed on Aug. 13, 2004.

(51) Int. Cl.
*G08G 13/00* (2006.01)

(52) U.S. Cl. .................. 340/565; 340/567; 340/541; 340/552; 340/539.22

(58) Field of Classification Search .................. 340/524, 340/517, 539.23, 539.26, 539.3, 541, 540, 340/545.3, 545.4, 552, 562, 565–567
See application file for complete search history.

(56) References Cited

U.S. PATENT DOCUMENTS

| | | | |
|---|---|---|---|
| 6,411,209 B1 * | 6/2002 | Lyons et al. | 340/541 |
| 6,486,778 B2 * | 11/2002 | Mahler et al. | 340/567 |
| 6,720,874 B2 * | 4/2004 | Fufido et al. | 340/541 |
| 6,995,355 B2 | 2/2006 | Rains, Jr. et al. | |
| 7,019,464 B2 | 3/2006 | Nevins | |
| 7,145,125 B2 | 12/2006 | May et al. | |
| 7,511,613 B2 * | 3/2009 | Wang | 340/539.26 |
| 7,554,437 B2 * | 6/2009 | Axelsen | 340/531 |
| 2004/0105264 A1 | 6/2004 | Spero | |
| 2007/0045524 A1 | 3/2007 | Rains, Jr. et al. | |

(Continued)

OTHER PUBLICATIONS

A. Zukauskas et al., Optimization of white polychromatic semiconductor lamps, Appl. Phys. Lett, 80 (2) (2002) 234-236.

(Continued)

*Primary Examiner*—Tuyet Thi Vo
(74) *Attorney, Agent, or Firm*—Robert F. Clark

(57) ABSTRACT

A method and system for controlling lighting in a space reduces energy consumption of the light sources by changing at least one of the color rendering index (CRI) and the correlated color temperature (CCT) while maintaining illumination levels. Preferably, the method and system sense movement of people in the space relative to light sources that light the space, and automatically and individually adjust plural solid state lighting devices that form each of the respective light sources to a first lighting condition when people are in a first position, wherein the lamps respectively emit light of a first illumination level and a first CRI at a first electrical power level, and to a second lighting condition when people are in a second position, wherein the light sources respectively emit light of the first illumination level and a smaller CRI than the first CRI and at a lower electrical power level than the first electrical power level.

11 Claims, 1 Drawing Sheet

U.S. PATENT DOCUMENTS

2008/0214963 A1* 9/2008 Guillemaud et al. ........ 600/595
2010/0026479 A1* 2/2010 Tran ........................... 340/501

OTHER PUBLICATIONS

Y. Ohno, Color Rendering and Luminous Efficacy of White LED Spectra, Proc., SPIE 49th Annual Meeting, (Aug. 2-6, 2004, Denver Colorado) 1-11.

A. Zukauskas et al., Quadrichromatic white solid-state lamp with digital feedback, Proc. of SPIE, Third International Conference on Solid State Lighting, vol. 5187 (Jan. 2004) 185-198.

Y.-L. Li et al., Performance characteristics of white light sources consisting of multiple light-emitting diodes, Proc. of SPIE, Third International Conference on Solid State Lighting, vol. 5187 (Jan. 2004) 178-184.

S. Chhajed et al., Influence of junction temperature on chromaticity and color-rendering properties of trichromatic white-light sources based on light-emitting diodes, J. Appl. Phys., 97 (2005) 054506-1-054506-7.

J. Pan et al., Optimized design of CCT tunable LED lighting source and its realization, CIE Midterm Meeting & LEON 2005 International Lighting Congress (Leon, Spain, May 12-17, 2005).

* cited by examiner

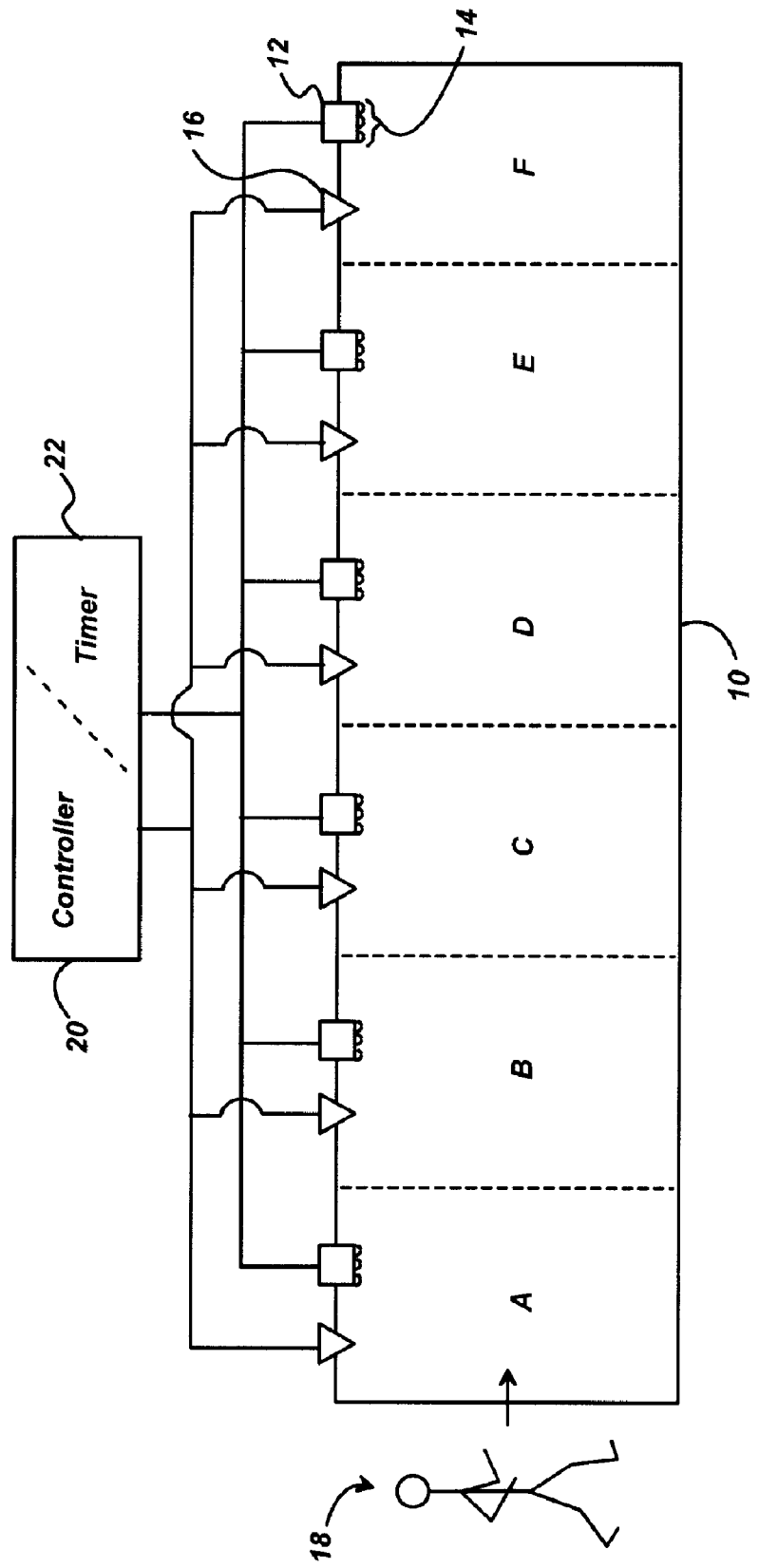

US 7,796,034 B2

METHOD AND SYSTEM FOR CONTROLLING LIGHTING

CROSS REFERENCE TO RELATED APPLICATION

This application is a divisional application of copending application Ser. No. 11/161,449, filed Aug. 3, 2005 U.S. Pat. No. 7,598,859 which claims the benefit of U.S. Provisional Application No. 60/601,373, filed Aug. 13, 2004.

BACKGROUND OF THE INVENTION

The present invention is directed to a method and system for automatically controlling lighting in a space.

In order to reduce energy consumption in office buildings, a number of different occupancy-sensing schemes have been developed to automatically control illumination levels depending on whether a space is occupied or not. Typically, the light level within a space is reduced when it is sensed that there is little or no activity within that space. This is often as simple as installing automatic "on-off" controls in each room.

These methods typically are implemented only in small rooms and private offices where occupancy can be distinctly determined and are seldom applied to larger public areas because they drastically impact the quality of lighting to the point of being deemed unacceptable. For example, areas such as cafeterias, cubicle office arrays, warehouses, and retail and department stores even when not directly occupied are still "on display." Dimming the lighting levels in such areas could present an uninviting, unsafe or closed-for-business atmosphere. Moreover, the energy-saving purpose is defeated if the lighting level for an entire large area must be increased when sporadically used by a low number of occupants.

Thus, the need exists for a system and method for controlling lighting that is suitable for large common areas and that avoids the problems of the prior art.

The following terms are used herein.

Illumination level is a measure of the amount of useable light which is incident on a surface, generally measured in units of luminous intensity per unit area.

Color rendering index (CRI) is a measure of the quality of light emitted by a light source with regard to its ability to effectively reproduce the color of an illuminated object. It is also indicative of the spectral characteristics of the emitted light. More particularly, CRI is a measure of the amount of color shift that objects undergo when lighted by a light source as compared to the color of those same objects when seen under a reference light source of comparable color temperature. CRI is expressed on a scale of 0-100, where 100 is the best for producing colors that are natural and vibrant.

Correlated color temperature (CCT) is a description of color appearance of a light source in terms of its warmth or coolness, measured in Kelvin (K). Lamps with a low CCT (3000K or less) generally have a yellow-white color and are described as "warm," while lamps with a high CCT (4000K or higher) have a blue-white color and are described as "cool."

SUMMARY OF THE INVENTION

An object of the present invention is to provide a novel method and system for controlling lighting that saves energy by reducing lighting quality (e.g., lowered CRI, altered CCT) without necessarily sacrificing illumination levels.

Another object of the present invention is to provide a method and system for controlling lighting in a space in which movement of people is sensed in the space relative to light sources that light the space A further object of the invention is to provide a method and system for controlling lighting in an illuminated space that takes advantage of the flexibility offered by solid-state lighting devices such as light emitting diodes (LEDs).

A still further object of the invention is to provide a method and system for controlling lighting that adjusts the lighting quality in a space in response to sensed occupancy level or activity in the space.

In accordance with one aspect of the invention, there is provided a method of controlling lighting in a space illuminated by a light source, comprising sensing an occupancy level or activity within the space and adjusting a color rendering index (CRI) of light emitted by the light source in response to the sensed occupancy level or activity.

In accordance with another aspect of the invention, there is provided a method of controlling lighting in an illuminated common space, comprising: automatically changing at least one of color rendering index (CRI) and color temperature (CCT) to separately change lighting quality in one or more spaced apart zones of the common space while maintaining a substantially constant illumination level throughout the common space, the change in the lighting quality being carried out by independently controlling light sources that separately light the zones and wherein the change in lighting quality is made in response to sensing a change in the occupancy level or activity in one or more of the zones.

In accordance with a further aspect of the invention, there is provided a method of controlling lighting in an illuminated common space, comprising the steps of:

providing plural spaced apart light sources in the space, each of the light sources having plural solid-state lighting devices;

sensing movement of people in the space relative to locations of the light sources; and in response to the sensing of people moving relative to the lamps, (a) automatically and individually adjusting the solid-state lighting devices in the respective plural light sources to a first lighting condition when people are in a first position relative to the respective light sources, wherein the respective light sources emit light having a first illumination level and a first CRI at a first electrical power level, and (b) automatically and individually adjusting the solid-state lighting devices in the respective plural light sources to a second lighting condition when people are in a second position relative to the respective light sources that is more distant than the first position, wherein the respective light sources emit light having the first illumination level and a second CRI that is less than the first CRI, the respective light sources operating at a second electrical power level when emitting light having the second CRI wherein the second electrical power level is less than the first electrical power level.

In accordance with yet another aspect of the invention, there is provided a system for controlling lighting in an illuminated space, comprising:

plural spaced apart light sources in the space, each of the light sources having plural solid-state lighting devices;

plural sensors that sense movement of people in the space relative to locations of the light sources; and a controller that, in response to the sensing of people moving relative to the light sources, (a) automatically and individually adjusts the lighting devices in the respective plural light sources to a first lighting condition when people are in a first position relative to the respective light sources, wherein the respective light sources emit light of a first illumination level and a first CRI at a first electrical power level, and (b)

automatically and individually adjusts the lighting devices in the respective plural light sources to a second lighting condition when people are in a second position relative to the respective light sources that is more distant than the first position, wherein the respective light sources emit light of the first illumination level and a second CRI that is less than the first CRI, the light sources operating at a second electrical power level when emitting light having the second CRI wherein the second electrical power level is less than the first electrical power level.

These and other objects, features, aspects and advantages of the invention will be apparent to those of skill in the art of the present invention after consideration of the following drawing and description of preferred embodiments.

BRIEF DESCRIPTION OF THE DRAWING

The FIGURE is a schematic representation of an embodiment of the present invention.

DETAILED DESCRIPTION OF THE INVENTION

The present invention is an occupancy/activity sensing method and system that exploits the controllability of solid-state lighting to provide an adaptable lighting environment that will be acceptable to users. Preferably, the method and system act to change the quality of the lighting (e.g., lower CRI and/or a different CCT) in a space when a change in the occupancy level or activity is sensed. This is preferably accomplished without substantially changing the level of illumination in the space. A substantial change in the illumination level would be a change that could be perceived by the normal occupant of the space. The lower quality of lighting is achieved at a lower electrical power level thereby providing energy savings without necessarily sacrificing the level of illumination.

As used herein, the occupancy level is simply the number of persons within the space and preferably is defined by two states, occupied and not occupied. An activity may include, but is not limited to, conditions related to the rate at which persons move through the space, time-related events such as after-hours usage, or task-related use of the space such as security surveillance, maintenance or cleaning. Sensing may be accomplished by a number of means including, but is not limited to, motion detectors, photo detectors, timers, and pressure transducers. For example, motion detectors may be used to detect whether or not a space is occupied or a timer may signal a predetermined change in the activity within the space.

The method and system of this invention may be applied to the lighting of any space including individual rooms, corridors, and large common spaces like cafeterias and office cubicle arrays. More preferably, the method and system should be applied to corridors and large common spaces where the illuminated space may be divided into multiple zones and it is desirable to maintain a substantially constant level of illumination over the entire space. In this case, only the occupied zones or the zones designated for a particular activity need the higher quality lighting (e.g., a higher CRI or a preferred CCT). The quality of the lighting in the remaining zones can be lowered to save energy while the illumination level remains substantially constant throughout the space.

With reference to the FIGURE, a system for controlling lighting in a space 10, e.g. a corridor, includes plural spaced apart light sources 12 that emit light into space 10, each of the light sources 12 having plural solid-state lighting devices 14 that emit light of different colors. Plural sensors 16 sense the movement of people 18 within space 10 relative to locations of light sources 12. Controller 20, in response to the sensing of people 18 moving relative to light sources 12 by means of sensors 16, automatically and individually adjusts lighting devices 14 in the respective plural light sources 12 to a first lighting condition when people are in a first position relative to the respective light sources, wherein the light sources respectively emit light of a first illumination level and a first CRI at a first electrical power level, and to a second lighting condition when people are in a second position relative to the respective light sources that is more distant than the first position, wherein the light sources respectively emit light of the first illumination level and a second CRI that is less than the first CRI. The light sources further operate a second electrical power level that is lower than the first electrical power level when emitting light having the second CRI.

The light sources 12 preferably include 4-6 of the solid-state lighting devices 14, where lighting devices 14 preferably are monochromatic light emitting diodes (LEDs) of different colors that together cover a large part of the visible spectrum. Each colored LED is individually controlled by controller 20 such that the composite output spectrum can be balanced via preprogrammed strategies to create light of varying characteristics, including adjustable CCT, CRI and illumination levels. Most applications require white light and the lighting devices 14 can be controlled by controller 20 so that light sources 12 emit white light. For example, lighting devices 14 may be selected from blue-, green-, yellow-, and red-emitting LEDs. Sensors 16 for sensing movement in the space and controller 20 for controlling light sources 12 may be conventional and their precise characteristics are not part of the present invention.

Zukauskas, et al. have explained ("Optimization of White Polychromatic Semiconductor Lamps," Applied Physics Letters, 2002, vol. 80, no. 2, pg 234) that LED efficacy can be increased by strategically lowering CRI. In principle, a 98 CRI LED could be spectrally tuned, preserving CCT and lumen output, to an 85 CRI mode using only 90% of initial wattage. Additional gains could be achieved by adjusting to a 70 CRI mode using approximately 86% initial wattage or even a 3 CRI mode using 77% initial wattage.

It has been determined that using standard LED spectra normalized to maximum theoretical power efficiency (i.e. radiant power), a 4-color LED light source (blue, true green, yellow, super-red) yielding a CRI of 90 can be rebalanced to a CRI of 48 with 77% of the initial wattage without a change in CCT. In a similar exercise with standard LED spectra, it can be shown that rebalancing a 3000K light source to a 4500K light source can reduce the wattage to as much as 90% of the initial (3000K) wattage with the same lumen output. While a 4-color LED light source is preferred, it is conceivable that other LED sources may be configured to achieve the same effect. For example, a 3-color LED source that contains LEDs that separately emit a red, green or blue emission. The LED source may also contain different "white" LEDs or more than four monochromatic LEDs to make the spectrum of the light source more continuous and therefore more adjustable.

Thus, the present invention controls lighting where dimming alone might create a distraction to users, but where reducing the quality of lighting (lower CRI or a less than desirable CCT) is acceptable provided the space is otherwise adequately illuminated. A system employing such techniques can operate during peak energy usage time periods in a "smart" manner that is essentially invisible to the occupants of the space.

The following is an example based on standard LED spectra (OSRAM Opto Semiconductors) with an assumption of equal power efficiency for all colors (blue, true green, yellow and super-red). Composite white spectra are modeled for various lighting conditions and the CRI, CCT and theoretical maximum LPW (lumens per watt) are shown in the following table. The composite white spectra modeled here are not mathematically optimized but have been roughly optimized using a trial and error approach. In the example, four lighting conditions may be programmed into the controller. Of course other lighting conditions may be defined and programmed as needed, with these being but an example.

| Lighting Condition (LCx) | Relative spectral energy Blue | Relative spectral energy Green | Relative spectral energy Yellow | Relative spectral energy Red | CCT | CRI | Theor. Maximum LPW | Relative wattage consumed |
|---|---|---|---|---|---|---|---|---|
| 1 | 0.32 | 1.0 | 0.89 | 1.09 | 3400K | 90 | 322 | 1.0 |
| 2 | 0.35 | 1.0 | 1.15 | 0.75 | 3400K | 80 | 357 | 0.9 |
| 3 | 0.67 | 1.0 | 1.93 | 0 | 3400K | 48 | 416 | 0.77 |
| 4 | 0.4 | 1.0 | 2.53 | 0 | 2800K | 38 | 451 | 0.71 |

These four lighting conditions (and others) may be used in various types of dynamic occupancy/activity sensing schemes. In this example, no dimming is used and the lighting conditions are such that illumination levels are held constant and only the quality of light is modified as occupancy/activity in the space changes. Of course, conventional dimming may be added to provide a further lighting option.

With reference again to the FIGURE, imagine that space 10 is a corridor that supports various types and patterns of pedestrian traffic, such as in an airport terminal or a university, for which 3400K lighting has been specified. Along the walls are pieces of artwork or advertisements that require a light source with a reasonable CRI in order to be properly appreciated. A network of conventional occupancy sensors 16 line the length of the corridor such that controller 20 can discriminate where people are and in which direction and how fast they are walking. The length of this corridor is divided into plural lighting zones of the same or different size (such as zones A-F in the FIGURE). The four lighting conditions described above are programmed into the controller according to predetermined occupancy/activity algorithms designed for various traffic patterns. Example traffic patterns are as follows:

I. No occupancy. To accommodate passing traffic in adjoining corridors the controller could be programmed to use LC1 (90 CRI) in zones A and F, use LC2 (80 CRI) in zones B and E, and use LC3 (48 CRI) in remaining interior zones. In this manner, passersby in the adjoining corridors would not perceive changes in the illumination level in corridor 10 nor would they notice the light quality change in the lighting in the interior zones of corridor 10.

II. Person 18 enters at zone A, walking at fast pace (obviously not inspecting the artwork or advertisements). In this case, the controller could be programmed to provide a smooth transition to LC2 for two zones ahead of the person and one zone behind, and then revert to LC3 as person passes and is more than one zone away.

III. Person walking at slow pace (perhaps mindful of the scenery). The controller might be programmed to use LC1 in the occupied zone and then provide a smooth transition to LC1 for two zones ahead and one zone behind as the person travels through the corridor. LC2 could be used for the third zone ahead of the person. In this manner, a high quality lighting is available to the person to observe the artwork or advertisements.

IV. Person stops (perhaps focused on art or advertisement). Similar to traffic pattern III above, except that the controller is programmed to maintain LC1 in the occupied zone and for two zones on either side of person. LC2 could then be used for one additional zone on each side of the LC1 zones.

V. After hours, security and maintenance workers (i.e., change of activity). The controller might be programmed to use LC4 in all zones during unoccupied periods (2800K, 38 CRI) and momentarily switch to LC2 for brief periods as the workers enter the zones. In this situation, a high quality lighting is not needed for the activities within the space, e.g., security surveillance and cleaning.

Note that the above examples of traffic patterns are not limiting, but rather illustrate the dynamic and reactive nature of the lighting system and method described herein. One can clearly imagine other public spaces operating with similar intelligence and design. A notable point is that the illumination level can be kept constant while reducing energy consumption and at no time does the space appear dark, uninviting or potentially unsafe. Additionally, the lighting effects will smoothly transition and will not create any apparent distraction. Note that the default 'unoccupied' periods of traffic patterns I and V above maintain the targeted illumination level with a zone-averaged wattage consumption of 84% and 71%, respectively, relative to the highest quality lighting condition (LC1) which might otherwise have been designed as the default.

The lighting technique described above is one of adjusting zones of a large common space to various levels of lighting quality (rather than illumination level) by independently and automatically controlling solid-state lighting devices, depending on whether those zones are occupied, proximal to occupied zones or sufficiently distant from occupied zones.

In a further embodiment, a timer 22 (shown in the FIGURE) may be used and the automatic and individual adjustment of the lighting devices may be made in response to the timer. For example, the timer may provide the time of day so, for example, the lighting condition of traffic pattern V above may be timely initiated or the timer may provide a time since a person was last sensed adjacent to a light source so that the lighting condition of one traffic pattern can transition to the lighting condition of another traffic pattern.

While embodiments of the present invention have been described in the foregoing specification and drawings, it is to be understood that the present invention is defined by the following claims when read in light of the specification and drawings.

What is claimed is:
1. A method of controlling lighting in an illuminated common space, comprising the steps of:
   providing plural spaced apart light sources in the space, each of the light sources having plural solid-state lighting devices;

sensing movement of people in the space relative to locations of the light sources; and in response to the sensing of people moving relative to the lamps, (a) automatically and individually adjusting the solid-state lighting devices in the respective plural light sources to a first lighting condition when people are in a first position relative to the respective light sources, wherein the respective light sources emit light having a first illumination level and a first CRI at a first electrical power level, and (b) automatically and individually adjusting the solid-state lighting devices in the respective plural light sources to a second lighting condition when people are in a second position relative to the respective light sources that is more distant than the first position, wherein the respective light sources emit light having the first illumination level and a second CRI that is less than the first CRI, the respective light sources operating at a second electrical power level when emitting light having the second CRI wherein the second electrical power level is less than the first electrical power level.

2. The method of claim 1, wherein the adjustment to the second lighting condition is further conditioned on a time since movement of the people to the second position was sensed.

3. The method of claim 1, wherein the light emitted at the first illumination level in the first and second lighting conditions is generally white and the solid-state lighting devices are selected from blue-, green-, yellow-, and red-emitting LEDs.

4. The method of claim 1, wherein the first lighting condition has a first correlated color temperature (CCT) and the second lighting condition has a second CCT that is different from the first CCT.

5. The method of claim 1, further comprising automatically and individually adjusting the lighting devices in the plural light sources to a third lighting condition in response to a sensed time wherein the light sources respectively emit light of the first illumination level and a third CRI that is less than the second CRI, the light sources operating at a third electrical power level when emitting light having the third CRI wherein the third electrical power level is less than the second electrical power level.

6. The method of claim 5, wherein the sensed time is a time of day.

7. The method of claim 1, wherein the first lighting condition has a first correlated color temperature (CCT) and the second lighting condition has a second CCT that is substantially the same as the first CCT.

8. The method of claim 7, wherein the light emitted at the first illumination level in the first and second lighting conditions is generally white and the solid-state lighting devices are selected from blue-, green-, yellow-, and red-emitting LEDs.

9. A system for controlling lighting in an illuminated space, comprising:

plural spaced apart light sources in the space, each of the light sources having plural solid-state lighting devices;

plural sensors that sense movement of people in the space relative to locations of the light sources; and a controller that, in response to the sensing of people moving relative to the light sources, (a) automatically and individually adjusts the lighting devices in the respective plural light sources to a first lighting condition when people are in a first position relative to the respective light sources, wherein the respective light sources emit light of a first illumination level and a first CRI at a first electrical power level, and (b) automatically and individually adjusts the lighting devices in the respective plural light sources to a second lighting condition when people are in a second position relative to the respective light sources that is more distant than the first position, wherein the respective light sources emit light of the first illumination level and a second CRI that is less than the first CRI, the light sources operating at a second electrical power level when emitting light having the second CRI wherein the second electrical power level is less than the first electrical power level.

10. The system of claim 9, wherein the light emitted at the first illumination level in the first and second lighting conditions is generally white and the solid-state lighting devices are selected from blue-, green-, yellow-, and red-emitting LEDs.

11. The system of claim 9, wherein the first lighting condition has a first correlated color temperature (CCT) and the second lighting condition has a second CCT that is substantially the same as the first CCT.

\* \* \* \* \*